(No Model.)  4 Sheets—Sheet 1.

A. F. BROWN & W. R. KNAUB.
HORSE HAY RAKE.

No. 478,084.  Patented July 5, 1892.

Witnesses.
J. Thomson Cross
E. W. Cadaughany

Inventors.
Arthur F. Brown
William R. Knaub
by Peck & Rector
their Attorneys.

(No Model.) 4 Sheets—Sheet 2.

A. F. BROWN & W. R. KNAUB.
HORSE HAY RAKE.

No. 478,084. Patented July 5, 1892.

Witnesses.
J Thomson Cross
E W Cardinghaus

Inventors
Arthur F Brown
William R Knaub
by Peck & Rector
their Attorneys.

THE NORRIS PETERS CO., PHOTO-LITHO., WASHINGTON, D. C.

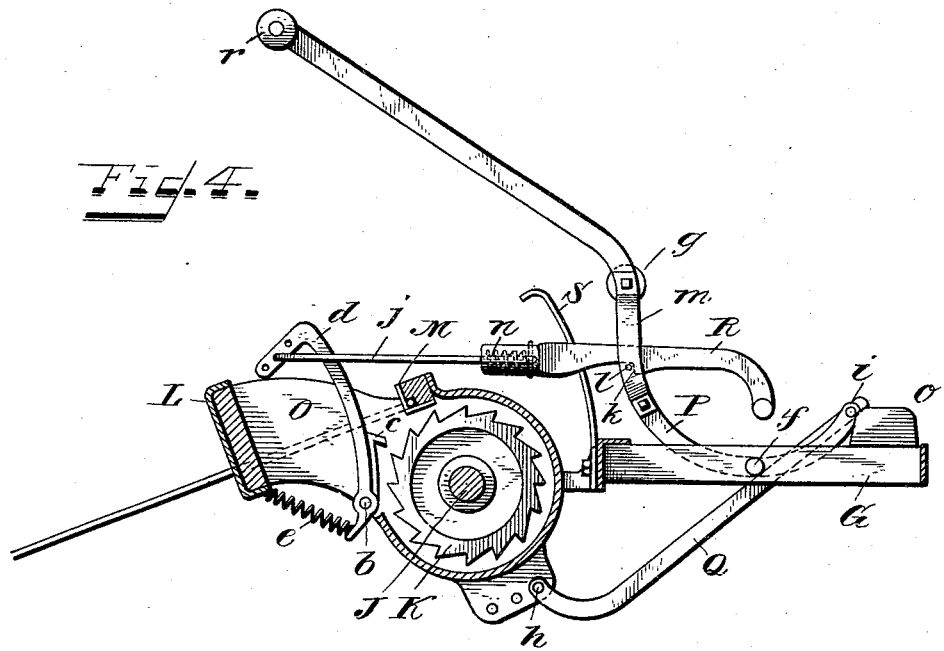
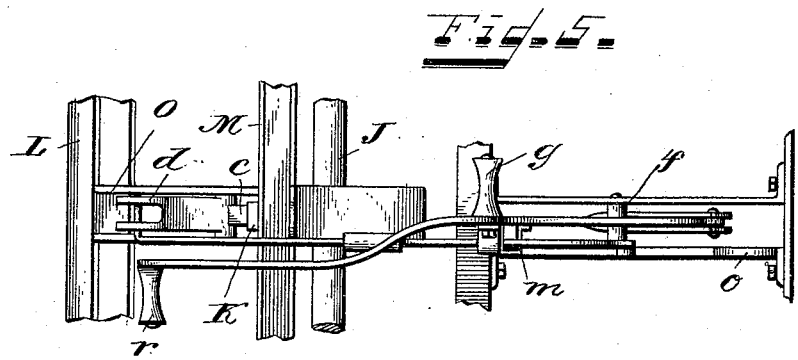

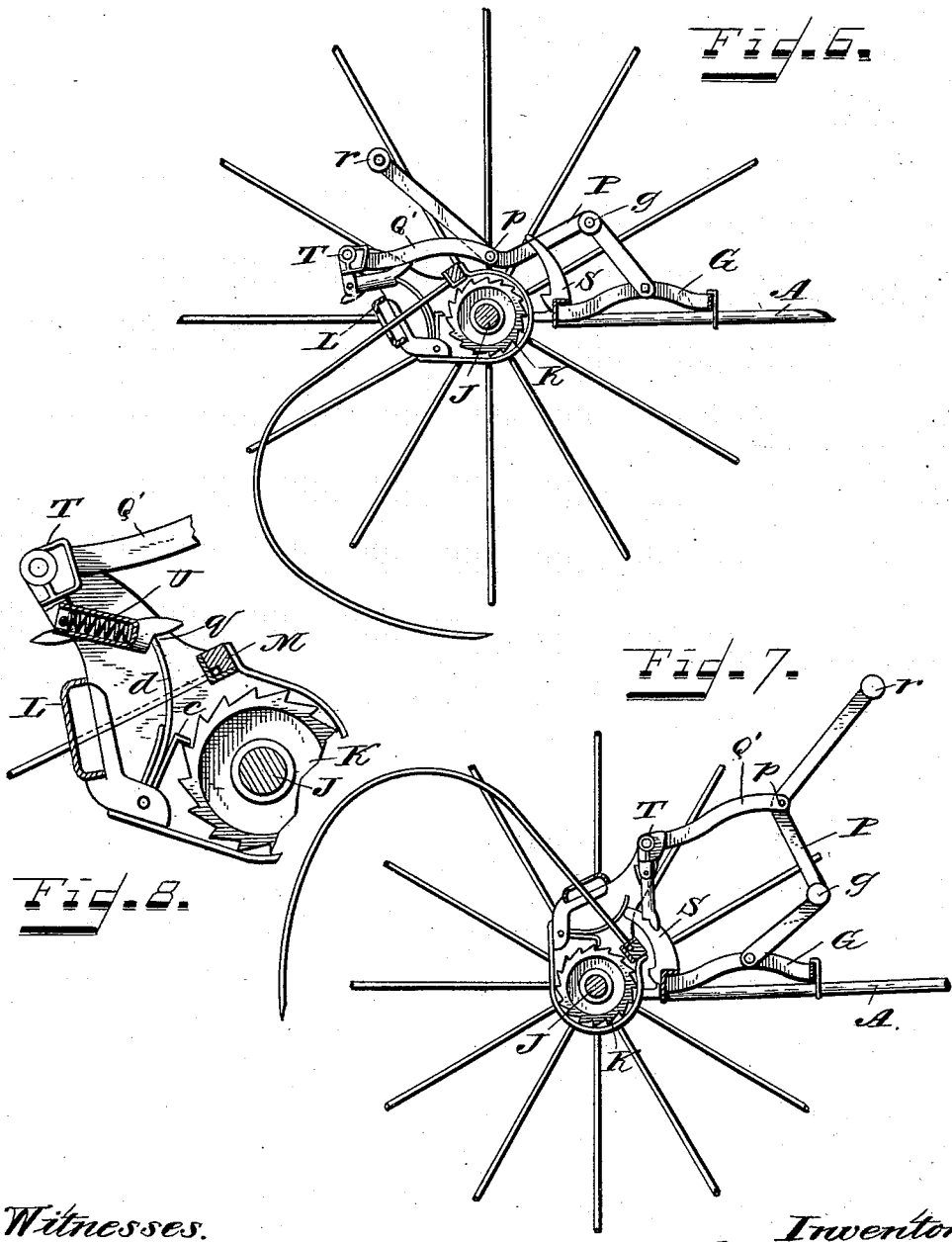

UNITED STATES PATENT OFFICE.

ARTHUR F. BROWN AND WILLIAM R. KNAUB, OF DAYTON, OHIO, ASSIGNORS TO THE STODDARD MANUFACTURING COMPANY, OF SAME PLACE.

HORSE HAY-RAKE.

SPECIFICATION forming part of Letters Patent No. 478,084, dated July 5, 1892.

Application filed January 25, 1892. Serial No. 419,138. (No model.)

*To all whom it may concern:*

Be it known that we, ARTHUR F. BROWN and WILLIAM R. KNAUB, citizens of the United States, residing at Dayton, in the county of Montgomery and State of Ohio, have invented certain new and useful Improvements in Horse Hay-Rakes, of which the following is a full, clear, and exact description, reference being had to the accompanying drawings, forming part of this specification.

Our invention relates to that class of horse hay-rakes known as "self-dump" rakes, in which the traction of the machine is employed to cause the tilting of the rake-head and the discharge of the collected load at the will of the operator; and it has for its object the improved construction of such rakes.

The novelty of our invention will be hereinafter described, and specifically pointed out in the claims.

Figure 1:
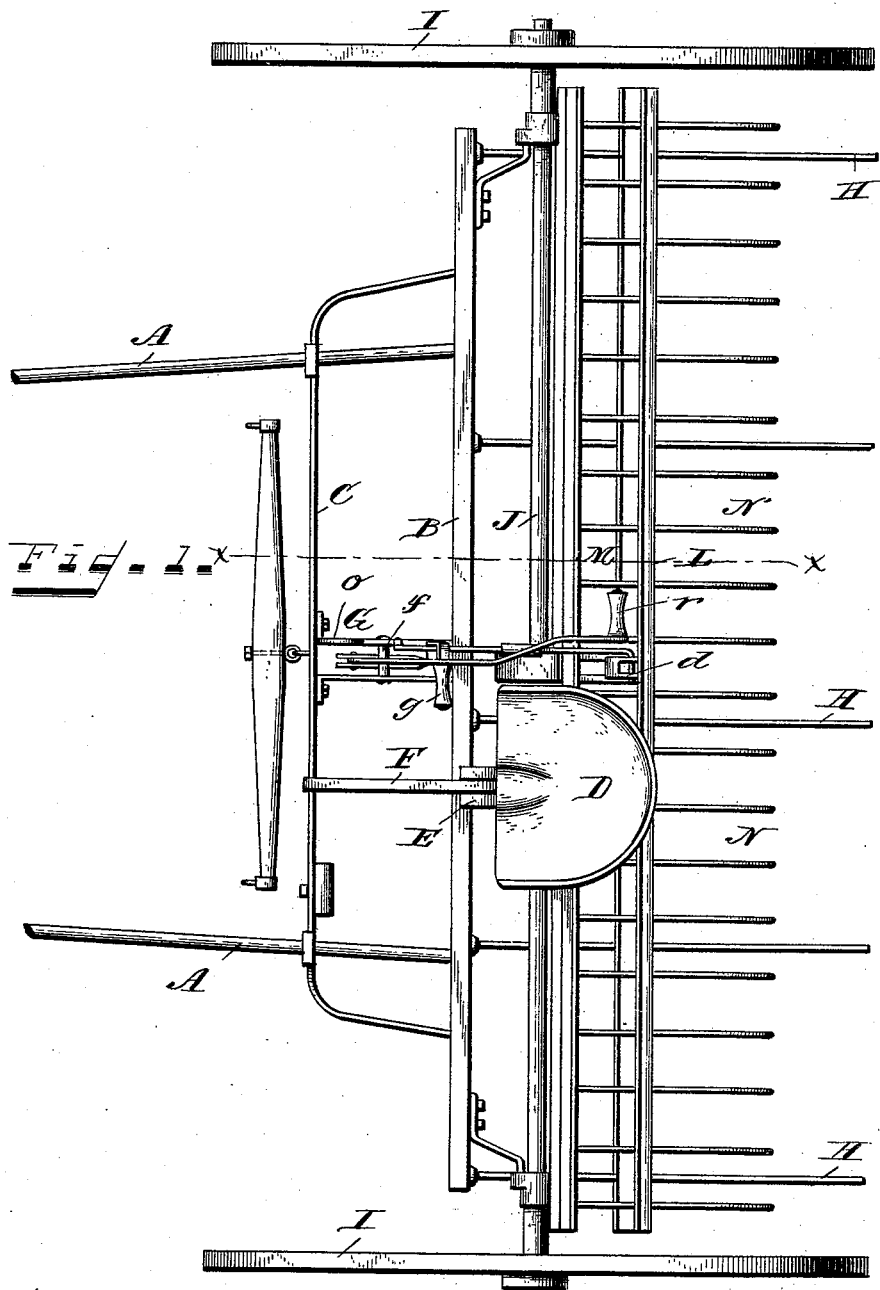
Figure 2:
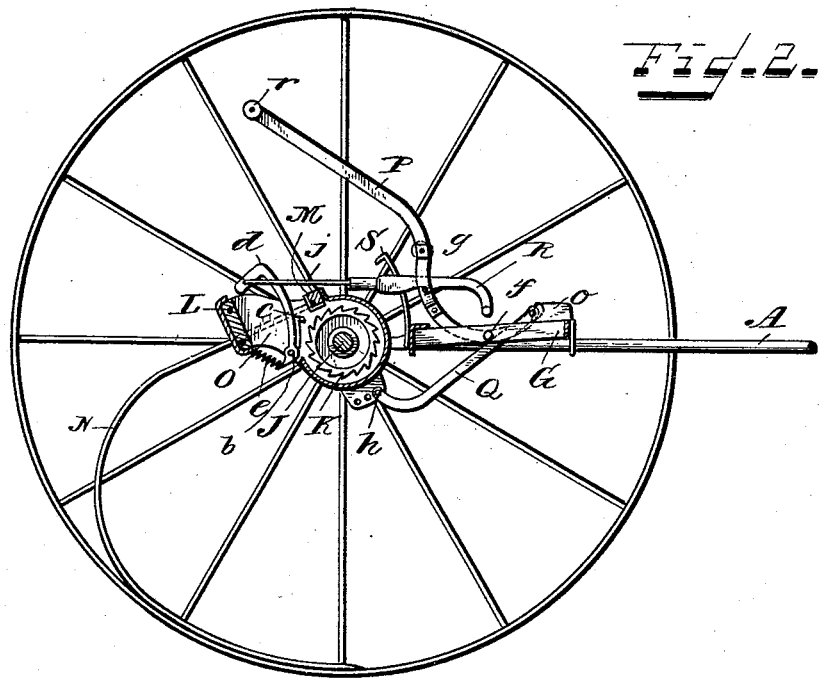
Figure 3:
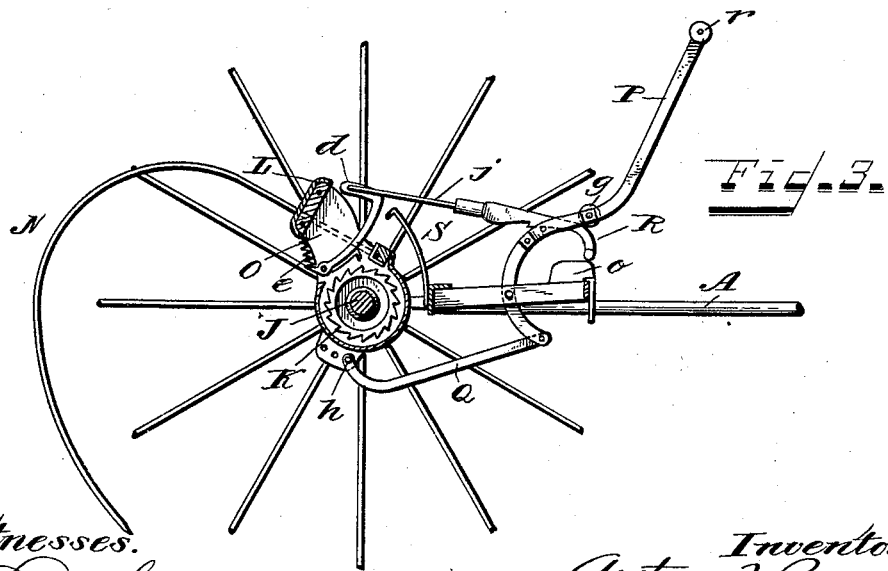

In the accompanying drawings, Figure 1, Sheet 1, is a plan view of a rake embodying our invention. Fig. 2, Sheet 2, is a sectional side elevation of the same through the dotted lines $x$ $x$ of Fig. 1, looking to the left from the rear and representing the normal position of the parts when the teeth are down at work. Fig. 3, Sheet 2, is a corresponding broken view, showing the position of the parts as the teeth begin to drop back. Fig. 4, Sheet 3, is an enlarged elevation of the dumping mechanism. Fig. 5, Sheet 3, is a plan view of Fig. 4. Fig. 6, Sheet 4, is a sectional elevation representing a modification in the dumping mechanism and with the teeth down. Fig. 7, Sheet 4, is a corresponding view with the teeth lifted. Fig. 8, Sheet 4, is an enlarged sectional elevation of the modified form of latch for the locking-dog and connected parts.

The same letters of reference are used to indicate identical parts in all the figures.

With the exception of the dumping mechanism, the rake may be of the usual or any suitable construction, the only essentials being a tilting rake-head, carrying a locking-dog, and a revolving lifting-wheel with which said dog is engaged at the will of the operator to lock the rake-head to the wheel to cause it to be tilted to discharge the collected loads, and a stop to disengage the dog from the lifting-wheel to permit the rake head and teeth to fall back to working position. We prefer to construct it, however, of metal, as described in our separate application of even date herewith, Serial No. 419,137, and it is only necessary here to say that A A are the thills, B the draft-bar, C the brace-bar, D the driver's seat on supports E F, G the cross-bars, and H the stripper-bars, these parts being connected together and constituting the draft and seat frame.

I are the supporting-wheels; J, a forwardly-revolving axle, to which is made fast at or near its middle a lifting ratchet-wheel K; L, the slotted bar, and M the tooth-holding bar, secured to the arms $a$, pivoted upon the axle and carrying the teeth N. The seat-frame and rake-head are connected in the usual or any suitable manner. Secured to the rake-head by the side of the lifting-wheel K, and preferably pivoted upon the axle, is a lifting-plate O, upon which, at $b$, Figs. 2 and 4, is pivoted a dog $c$, formed or carried upon an upwardly-extending arm $d$. A spring $e$, engaging the lower end of the arm $d$, normally holds the dog $c$ out of engagement with the wheel K.

Pivoted to the bar G, as at $f$, is an arm P, extending rearward and upward from said pivot and forward and upward from said pivot. This arm is provided with a pedal $g$, Fig. 5, upon which the driver's foot continually rests.

Pivoted, as at $h$, to the rake head or plate O beneath its axis is an arm Q, extending forward and upward and having its end pivoted to the forward end of the arm P at $i$. Any suitable stop, as the pin $f$, serves as a lock for the levers P and Q to limit the downward and forward movement of the teeth when the driver presses upon the pedal $g$, as will be readily understood.

Pivoted to the upper end of the dog-arm $d$ is a rod $j$, extending forward and connected to the rear end of a latch-bar R, which passes by the side of the arm P and is provided with a shoulder $k$ to engage a pin $l$ upon the arm P. The arm R preferably passes through a strap-box $m$, Figs. 4 and 5, secured to the arm P and which serves as a guide. The connection between the rod $j$ and arm R is preferably a telescopic connection, as shown by the dotted lines in Fig. 4, where the forward end of the rod *j* enters a tubular recess in the rear of the arm R, containing a coiled spring *n*, engaged by both, so as to be put under tension when the arm R is drawn forward and the dog *c* happens to strike upon the point of a tooth of the lifting-wheel K. As the wheel continues to revolve the expansion of the spring draws the dog properly into engagement with the lifting-wheel.

By the above construction we have provided automatic means for causing the locking of the rake-head to the lifting-wheel at the will of the operator, for as soon as a load has been collected the driver merely releases the pressure of his foot upon the pedal *g*, whereupon the resistance of the load on the teeth partially tips up the rake-head, and thereby draws down the arm Q and throws the rear end of the arm P forward, which in its turn draws on the arm R and rod *j* and brings the dog *c* into engagement with the revolving lifting-wheel K, thereby locking the rake-head to the lifting-wheel and effecting the dump. Before the teeth have been entirely lifted the forward and downwardly projecting end of the arm R comes in contact with a projection *o* on the seat-frame, which lifts the arm R and frees the shoulder *k* from the pin *l*, Fig. 3. When the teeth are sufficiently lifted, the dog-arm *d* comes in contact with a stop S upon the seat-frame, which presses the dog out of engagement with the lifting-wheel and permits the teeth and rake-head to fall back to working position, thereby restoring the position of the parts and re-engaging the shoulder *k* with the pin *l*. The driver by keeping his foot upon the pedal *g* can let the rake-head down as fast or as slow as he pleases, or he can hold the teeth up if he desires to turn without raking or wishes to leave the field.

In Figs. 6, 7, and 8 we have shown a modification in the construction in which the arm Q', which corresponds to the arm Q, is pivoted to the rake head or plate and over the lifting-wheel and is pivoted to the arm P at *p*. The latch in this case is formed of two hinged members T and U, Fig. 8, the former of which is made fast to the arm Q' and the latter of which has a shoulder *q*, engaging the upper end of the dog-arm when the teeth are down at work, as seen in Fig. 6. As soon as the driver releases the pressure of his foot from the pedal *g*, the action of the load, as before, starts the tilting of the rake-head and raises the arm Q', thereby acting as a toggle upon the member U and forcing the dog into engagement with the ratchet, as seen in Fig. 8. As the head goes on up, the latch leaves the dog and is suspended as seen in Fig. 7. Upon the resetting of the head the shoulder *q* becomes re-engaged with the dog-arm ready for the next dump. The arms P are preferably extended rearwardly and provided with grasping-handles *r* to enable the rake to be dumped by hand, if desired.

In the modification shown in Figs. 6, 7, and 8 we prefer to employ a spring connection between the members T and U to act as described in the connection between *j* and R.

Having thus fully described our invention, we claim—

1. In a horse-rake, the combination of a pedal for holding the rake head and teeth down to work, a lifting-wheel revolved by the traction of the machine, a tilting rake-head carrying a locking-dog for locking the rake-head to the lifting-wheel, an automatic latch actuated by the partial tilting of the rake-head when pressure is removed from the pedal to cause the engagement of the dog and lifting-wheel, and a stop to cause the disengagement of the dog and lifting-wheel when the teeth have been sufficiently elevated, substantially as described.

2. In a horse-rake, the combination of a lifting-wheel revolved by the traction of the machine, a tilting rake-head carrying a locking-dog for locking the rake-head to the lifting-wheel, an arm pivoted to the rake-head, a second arm pivoted to the seat-frame and to said first-named arm, a pedal for exerting pressure upon said last-named arm, a latch connecting the pedal and locking-dog and operated by the resistance of the load to engage the locking-dog with the lifting-wheel when pressure on the pedal is relieved, and a stop to disengage the dog from the lifting-wheel, whereby the driver by the action of his foot upon the pedal can hold the rake down to work, can cause the automatic locking of the rake-head to the lifting-wheel to effect the dump, and can regulate the return of the rake-head, substantially as described.

3. In a horse-rake, the combination of the revolving lifting-wheel K, the rake-head having pivoted thereto a dog *c*, the arm Q, pivoted to the rake-head beneath the axis of the same and to an arm P, pivoted to the seat-frame, the latch-arm R, engaging the arm P and connected to the dog-arm *d* by the rod *j*, the spring *n*, and the stops S *o*, substantially as described.

ARTHUR F. BROWN.
WILLIAM R. KNAUB.

Witnesses:
WARREN HALL,
WM. W. WAGNER.